US006478953B2

(12) United States Patent
Spearman et al.

(10) Patent No.: US 6,478,953 B2
(45) Date of Patent: Nov. 12, 2002

(54) OIL FILTER AND DEHYDRATOR

(75) Inventors: Michael R. Spearman, The Woodlands, TX (US); David Kolstad, White Bear Township, MN (US); John H. Burban, Lake Elmo, MN (US); Craig J. Cuta, White Bear Lake, MN (US); Mathews Thundyil, College Station, TX (US); Majid Zia, White Bear Township, MN (US)

(73) Assignee: Porous Media Corporation, St. Paul, MN (US)

( * ) Notice: Subject to any disclaimer, the term of this patent is extended or adjusted under 35 U.S.C. 154(b) by 0 days.

(21) Appl. No.: 09/727,086

(22) Filed: Nov. 30, 2000

(65) Prior Publication Data

US 2002/0063087 A1 May 30, 2002

(51) Int. Cl.[7] ............................................. B01D 61/36
(52) U.S. Cl. ...................... 210/130; 210/137; 210/254; 210/259; 210/321.65; 210/DIG. 5
(58) Field of Search ......................... 210/97, 123, 130, 210/168, 254, 258, 259, 321.6, DIG. 5, 640, 644, 651, 799, 137, 433.1, 321.65; 184/6.24; 159/DIG. 10, DIG. 16, DIG. 27

(56) References Cited

U.S. PATENT DOCUMENTS

| 4,351,732 A | * | 9/1982 | Psaras et al. |
| 4,493,772 A | | 1/1985 | Tanaka |
| 4,615,811 A | | 10/1986 | Watkins |
| 4,655,938 A | | 4/1987 | Fragola |
| 4,780,203 A | | 10/1988 | Barcy |
| 4,780,211 A | | 10/1988 | Lien |

(List continued on next page.)

OTHER PUBLICATIONS

The Handbook of Industrial Membranes, 1st edition, 1995, pp. 56–59.*
Membrane Handbook, 1992 by Van Nostrand Reinhold, pp. 3–15.*
K. Scott; Handbook of Industrial Membranes, 1st Edition; Elsevier Advanced Technology, Oxford, U.K.; 1995.
Kaydon Custom Filtration; Unique Process Technology Turbo–Toc Turbine Oil Conditioner; LaGrange, GA, May 1993.
Pall Industrial Hydraulics Company; East Hills, NY; HSP 180 Series Portable Oil Purifier; 1993.
Pall Industrial Hydraulics Company; East Hills, NY; HVP Series Portable Oil Purifier; 1994.
Vacudyne Incorporated; Chicago Heights, IL; Oil Purification Systems, undated.
Vacudyne Incorporated; Chicago Heights, IL; Oil Purification Systems for the Utility Industry, undated.
Hilliard Hilco Division; Hilco Fluid Contamination Control, undated.
Ho & Sirkar; Membrane Handbook, Van Nosterand Reinhold, NY; Overvew; 1992.

*Primary Examiner*—Joseph W. Drodge
*Assistant Examiner*—Terry K. Cecil
(74) *Attorney, Agent, or Firm*—Marshall & Melhorn, LLC (57) ABSTRACT

A combination filter/dehydrator is disclosed which first filters a stream of oil or fluid of low volatility to remove particulate contaminants, and then passes the stream through a dehydrator 38 to remove free, emulsified, or dissolved entrained water. A pressure control valve 46 is provided to enable a portion of the oil stream to bypass the dehydrator in order to maintain a predetermined pressure differential across the dehydrator membrane. A discharge chamber (FIG. 5) is provided at an outlet of the dehydrator to prevent the loss of oil that has permeated the dehydrator membrane. A sweep gas stream 70 for removing water from the permeate side of the dehydrator membrane can include a coalescer 72 (FIG. 4) for removing liquids entrained in the sweep gas before entering device.

11 Claims, 5 Drawing Sheets

U.S. PATENT DOCUMENTS

| | | | |
|---|---|---|---|
| 4,790,941 A | * | 12/1988 | Taylor |
| 4,844,804 A | | 7/1989 | Taylor |
| 4,846,977 A | * | 7/1989 | DeVellis et al. |
| 4,850,498 A | | 7/1989 | Taylor |
| 4,857,081 A | | 8/1989 | Taylor |
| 4,877,533 A | | 10/1989 | Meldrum et al. |
| 4,886,603 A | | 12/1989 | Taylor |
| 4,892,667 A | * | 1/1990 | Parker et al. |
| 4,931,181 A | | 6/1990 | Blume et al. |
| 5,069,799 A | | 12/1991 | Brownawell et al. |
| 5,076,932 A | | 12/1991 | Taylor |
| 5,108,549 A | * | 4/1992 | Wenzlaff et al. |
| 5,126,503 A | | 6/1992 | Bartels |
| 5,131,266 A | * | 7/1992 | Hassett |
| 5,158,681 A | | 10/1992 | Freeman et al. |
| 5,182,022 A | | 1/1993 | Pasternak et al. |
| 5,203,969 A | | 4/1993 | Wenzlaff et al. |
| 5,211,856 A | | 5/1993 | Shen |
| 5,277,827 A | | 1/1994 | Osborne |
| 5,443,724 A | | 8/1995 | Williamson et al. |
| 5,464,540 A | | 11/1995 | Friesen et al. |
| 5,552,023 A | | 9/1996 | Zhou |
| 5,552,054 A | | 9/1996 | Koops et al. |
| 6,001,257 A | | 12/1999 | Bratton et al. |

* cited by examiner

OIL FILTER AND DEHYDRATOR

BACKGROUND OF THE INVENTION

1. Field of the Invention

The present invention relates generally to the lubrication and hydraulic and electric insulating fluid industry, and particularly to an apparatus and a process used for the removal of particulate contaminants and free, emulsified, or dissolved water from oil.

2. Discussion of the Related Art

Oil is used in lubrication and hydraulic systems. It is also used as an electrical insulating fluid. It is widely recognized that the presence of particulate contamination and water have deleterious effects on the oil in such systems, the components in the systems, and the operation of the systems. It is well known that corrosion, reduced dielectric strength, oil oxidation, chemical wear and tear, reduced bearing fatigue life and loss of lubricity may result when water contamination enters a lubrication or hydraulic system. These deleterious effects can be directly attributed to water present in free, emulsified or dissolved form. It is also well known that particulate contamination can cause increased wear and tear, reduced bearing fatigue life, and reduced dielectric strength.

The devices and systems that have been used to remove water contamination include settling tanks or reservoirs, centrifuges, water absorbing filters, and vacuum dehydration oil purifiers. Devices used to remove particulate contamination include filters. However, these have had significant limitations in either their water removal capabilities, particulate contamination removal capabilities, ease of operation, capital costs, or operating costs.

SUMMARY OF THE INVENTION

The present invention details a device that enables the removal of particulate contamination and free, emulsified or dissolved water from oils. This device is such that it may be used on mobile equipment while in operation and moving, as well as on stationary equipment and processes. The operation of this process is simple, while the equipment in question is small and compact making it practical and cost effective for systems of all sizes.

Specifically, this invention relates to a device that employs a filter to selectively remove particulate contamination (above a desired particle size) and a dehydrator to selectively remove the water from the oil. The use of a membrane based dehydrator has been detailed in co-pending U.S. patent application Ser. No. 09/321,887 and 09/552,369 filed by Applicant's assignee.

Significant efforts have been made to remove particulate contamination and water from oil in order to provide the clean, dry oil necessary for optimal performance of these systems. It is also known that particulate contamination is a greater challenge in these systems than is moisture ingression, therefore, it is often desirable to have a system with a large filter and a proportionally smaller dehydrator. In a situation such as this, it would be unnecessary to process the entire volumetric flow of oil through the dehydrator.

Consequently, it is desirable to have a system that filters the full volumetric flow of oil, but dehydrates only a portion of this flow.

In addition, during cold start up of the system, the viscosity of the oil is significantly higher than the viscosity at the mean operating temperature. The pressure drop required to flow this volumetric flow of oil through the dehydrator may be significantly greater than at mean operating conditions. It is preferable, in this situation to process only a portion of the total volumetric flow of oil through the dehydrator.

If the filter dehydrator is operated outside its design parameters it is possible that membrane, or the seals in the dehydrator may be compromised. This could lead to the transmission of the oil into the permeate chamber. It is preferable to have a discharge chamber at the outlet of the permeate stream designed to capture any liquids in this part of the system. The liquid capture may be sensed by means of a float valve, liquid level control or any other means known in the art. Upon sensing the presence of liquid in the discharge chamber it is preferable to shut off the sweep or vacuum to prevent further loss of oil. It may also be preferable to trigger an alarm upon detecting the presence of liquid in the discharge chamber.

In one embodiment of the present invention a method is disclosed to dehydrate industrial fluids which includes the steps of:

(a) providing an air sweep to remove the water extracted from the oil;

(b) providing a means to filter the air sweep;

(c) providing a means to remove liquid water contamination of the air sweep;

(d) providing a means to dehydrate the air sweep prior to contacting the filter dehydrator;

(e) removing, from the feed side of the dehydrator, the oil that is dehydrated, (f) providing for a pressure control valve between the outlet of the filter and inlet of the dehydrator that enables the bypass of the oil around the dehydrator.

(g) providing for this pressure control valve to be intrinsic or extrinsic to the entire system.

(h) providing the possibility for the clean, dry oil exiting from the dehydrator to merge with the bypass stream;

(i) providing, in the sweep outlet, a sweep discharge chamber that is able to sense the presence of liquid in the sweep and shut off the sweep flow to prevent loss of oil.

In another embodiment of the present invention, an apparatus is provided for providing clean, dry, oil which includes:

(a) a vessel containing at least a filter interposed in said vessel in such a fashion as to divide the interior of the vessel into at least one feed-side space and one filtrate-side space;

(b) at least one inlet opening to the feed-side space;

(c) at least one outlet opening to the filtrate-side space;

(d) at least another vessel containing at least a dehydrator interposed in said vessel in such a fashion as to divide the interior of the vessel into at least one dehydrator feed side space and one dehydrator permeate space;

(e) at least one inlet opening to the dehydrator feed-side space;

(f) at least one outlet opening to the dehydrator permeate space;

(g) at least a pressure control valve interposed between the inlet to the dehydrator and the system outlet;

(h) a partial bypass that would be activated by the pressure control value;

(i) at least a sweep discharge chamber designed to capture any liquids in the sweep;

(j) and at least a system designed to shut off the sweep flow upon a capture of liquids in the sweep chamber.

Thus, it is an object of the present invention to provide an improved filter/dehydrator for the removal of particulate contaminants and free, emulsified, or dissolved water from oil.

Another object of the present invention is to overcome the shortcomings of conventional oil dehydration techniques, and provide a new device that overcomes these limitations.

Another object of the present invention is to provide a filter dehydrator that removes free, emulsified or dissolved water from oils.

Another object of the present invention is to provide a filter dehydrator that removes particulate contamination from oils.

A further object of the present invention is to provide a means of protecting the dehydrator from system pressures that exceed its design criteria. This may be accomplished by means of a pressure control valve that enables a portion of the fluid to bypass the dehydrator.

A further object of the present invention is to provide a means of protecting the dehydrator from differential pressures that exceed its design criteria. This may be accomplished by means of a pressure control valve that enables a portion of the fluid to bypass the dehydrator.

A further object of the present invention is to provide a means for the removal of water from the system after it has been extracted from the oil.

A further object of the present invention is to provide a means for preventing the loss of the oil in the stream removing the water from the system.

A further object of the present invention is to provide a pump that drives the fluid through the filter dehydrator.

A further object of the present invention is to provide a filter dehydrator that is simple to operate.

A further object of the present invention is to provide a filter dehydrator that is relatively small and compact.

A further object of the present invention is to provide a filter dehydrator that is cost effective.

A further object of the present invention is to provide a filter dehydrator that is practical to use on small and large systems.

A further object of the present invention is to provide a filter dehydrator that may be used on mobile equipment while in operation and moving.

Further objects and advantages of the present invention will be apparent from the following description and appended claims. Reference will be made to the accompanying drawings forming a part of the specification, wherein like reference characters designate corresponding parts in the several views.

It is to be understood that the specific devices illustrated in the attached drawings, and described in the following description, are exemplary embodiments of the inventive concepts defined in the appended claims. Hence, specific dimensions and other physical characteristics relating to the embodiments disclosed herein should not be considered as limiting, unless the claims expressly state otherwise.

Before describing the preferred embodiment of the invention, incorporated herein by reference, as if fully rewritten, are the *Membrane Handbook*, pages 3–15, published by Van Nostrand Reinhold, 1992 and the *Handbook of Industrial Membranes First Edition*, pages 56–59, 1995.

DESCRIPTION OF THE PREFERRED EMBODIMENT

According to the present invention, there is an apparatus with utility in the discriminating removal of particulate contamination and free, emulsified and dissolved water from oils.

Such an apparatus would enable flowing the unpurified oil in through the inlet opening of the filter; selectively removing particulate contamination by flowing through the filter, if desired, contacting the fluid with a pressure control valve that provides for a partial bypass of the membrane based dehydrator; contacting at least a portion of the fluid with the membrane based dehydrator; maintaining a chemical potential gradient for water such that the water preferentially permeates through the membrane based dehydrator from the feed side to the permeate side; removing, from the permeate side, the water that has permeated through the outlet opening; removing from the feed side of the dehydrator, the clean, dry oil, through the outlet opening; and, if desired, merging the clean, dry oil stream with the bypass stream exiting from the pressure control valve. The water may be removed from the system in the vapor phase either by means of a vacuum, or by means of a sweep gas stream. The sweep gas may be air, nitrogen, argon or any other vapor stream. The sweep gas may be a compressed gas.

The dehydrator used may be a membrane made, at least in part, of a thin, defect free, dense, nonporous, discriminating layer (the term "discriminating layer" may also be referred to as "skin") and a support structure. The membrane can be in any form or shape as long as a surface suitable for separation is provided. Common examples of this include self-supported films, hollow fibers, composite sheets and composite hollow fibers. The filter may be based on any type of known techniques to filter a fluid. The water may be removed in the vapor phase by means of vacuum, or by a gas sweep. The gas used to sweep the water away may be air. This gas may be filtered and dried prior to contacting the filter/dehydrator.

Since it may be unnecessary to process the entire volumetric flow of oil through the dehydrator, a pressure control valve is provided that can provide a partial bypass of the dehydrator. It may also be necessary to partially bypass the dehydrator when the viscosity of the oil reaches levels such that the pressure in, or pressure drop across the dehydrator is likely to exceed dehydrator design limits.

This device may be used to treat oil in a "kidney-loop" system, where the filter dehydrator is connected to a reservoir which is part of a piece of equipment. The oil is withdrawn from the process reservoir, processed through the dehydrator, and then returned to the reservoir. The oil dehydrator may be operated continuously or intermittently while the main system is operating, or while it is at rest. This device may also be used "off-line" to treat the fluid in a reservoir. This reservoir is not connected to any piece of operating equipment and serves as a container for conditioning the fluid.

In addition to conventional applications, this device may be used "in-line." Since the feed and permeate spaces are separated by a dense, nonporous barrier, it is possible to operate the device such that the feed and permeate are at different pressures. Therefore, the device may be operated in such a way that the oil is at the pressure of the system in which it is used. Consequently, this opens the possibility of using such a device and process "in-line", which is the preferred embodiment of this invention. The need for conventional off-line or kidney-loop systems is reduced and may be eliminated. Being able to use the present invention in-line and at system pressure allows it to be compact and lightweight and useful on virtually all hydraulic or lubrication equipment. In addition, it can be used on stationery or mobile equipment since additional power, pumps and controls are not required.

Figure 1:
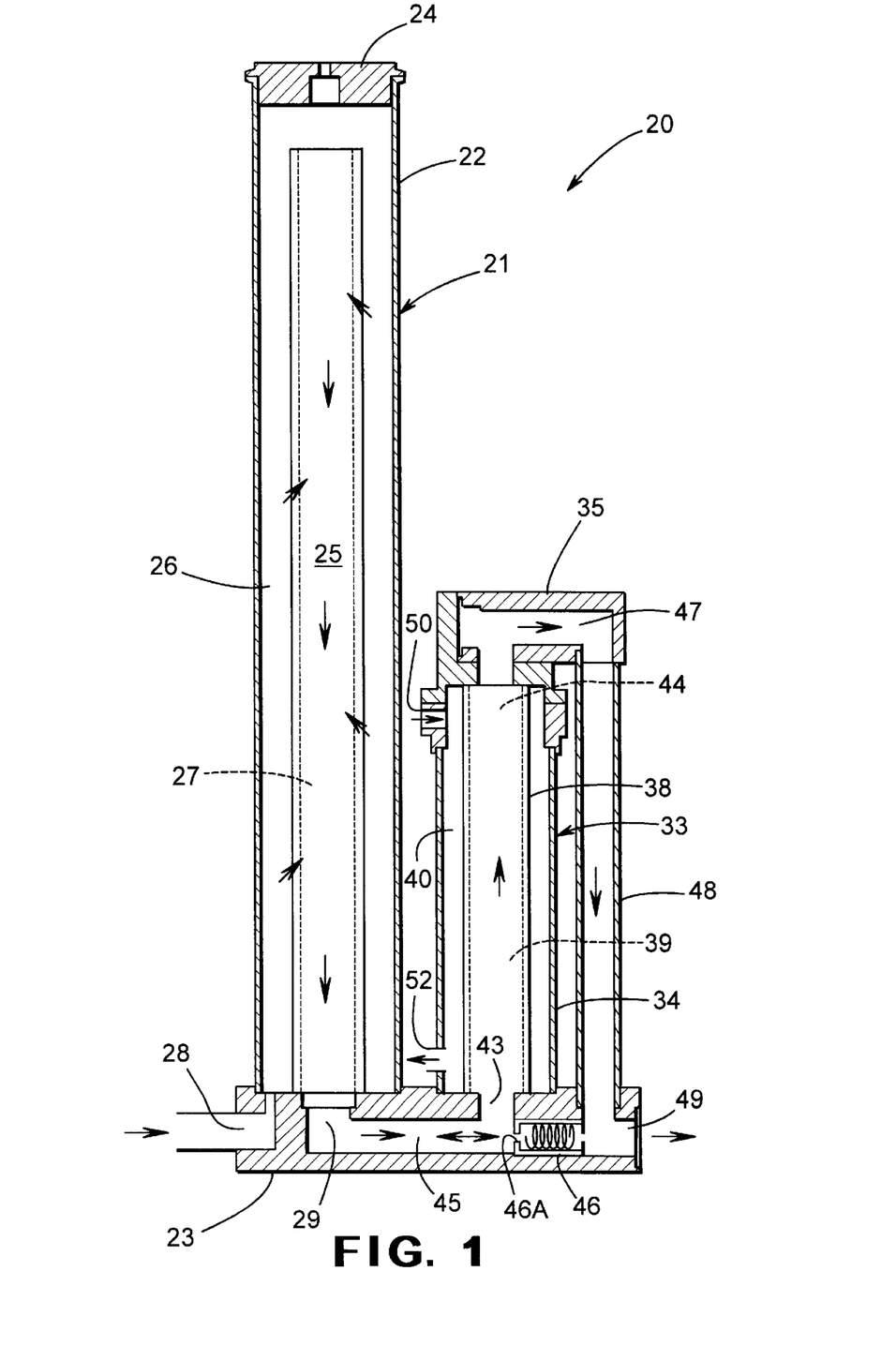
FIG. 1 is an elevational view, partly in section, showing a construction embodying the present invention.

Referring to FIG. 1, there is shown a membrane based filter/dehydrator, generally designated by the numeral 20. The membrane based filter/dehydrator 20 includes a first fluid containing vessel 21 comprising a tube or cylinder 22 mounted to a base 23 and closed by a first end cap 24. A filter 25 is mounted to the base 23. The filter 25 may be tubular or cylindrical in shape, and divides the interior of the first fluid containing vessel 21 into a feed-side space 26 and a filtrate-side space 27.

The base 23 has an inlet 28 in fluid communication with the feed-side space 26, and an outlet 29 in fluid communication with the filtrate-side space 27.

Also mounted to base 23 is a second fluid containing vessel 33. The second fluid containing vessel 33 comprises a second tube or cylinder 34 mounted to base 23 and closed by a second end cap 35. A dehydrator 38 is mounted to the base 23. The dehydrator may be tubular, cylindrical, or of other desired shape, and divides the interior of the second fluid containing vessel 33 into a dehydrator feed-side space 39 and a dehydrator purge or permeate-side space 40.

Dehydrator 38 is provided with dehydrator inlet 43, and dehydrator outlet 44. The dehydrator inlet 43 is in fluid communication with the filter outlet 29 through first passageway 45. Dehydrator outlet 44 is in communication with the atmosphere through second passageway 47 provided in second end cap 35, conduit 48 mounted between second end cap 35 and base 23, and system outlet 49 provided in base 23. It is well within the scope of the present invention that the first fluid containing vessel 21 and the second fluid containing vessel 33 be mounted on separate bases, with appropriate fluidic connections replacing the various internal passages and conduits shown.

A sweep or purge inlet 50 is provided on second tube or cylinder 34, which is in fluid communication with the purge-side space 40. A sweep or purge outlet 52 is provided proximate the other end of second tube or cylinder 34, which is also in fluid communication with the purge-side space 40. A sweep gas is passed through the purge-side space in a manner known in the art to remove free, emulsified, or dissolved oil from the water passing through the filter/dehydrator 20. The positions of the sweep inlet 50, and the sweep outlet 52, may be reversed to provide co-current flow if desired.

A pressure control valve 46, of a type well known in the art, may be interposed in first passageway 45, between the system outlet 49 and dehydrator inlet 43 the pressure control valve 46 may be configured to block all, or some of the flow bypassing the dehydrator 38 at a predetermined pressure. In the preferred embodiment illustrated, the pressure control valve 46 is spring loaded, and would advance and retract in reaction to any change in the differential pressure across the valve. At normal operating temperatures and pressures, control valve 46 would be fully closed, and only a relatively small amount of oil would flow through the bypass opening 46A. At higher operating pressures, or differential pressures, more oil would bypass the dehydrator.

Figure 2:
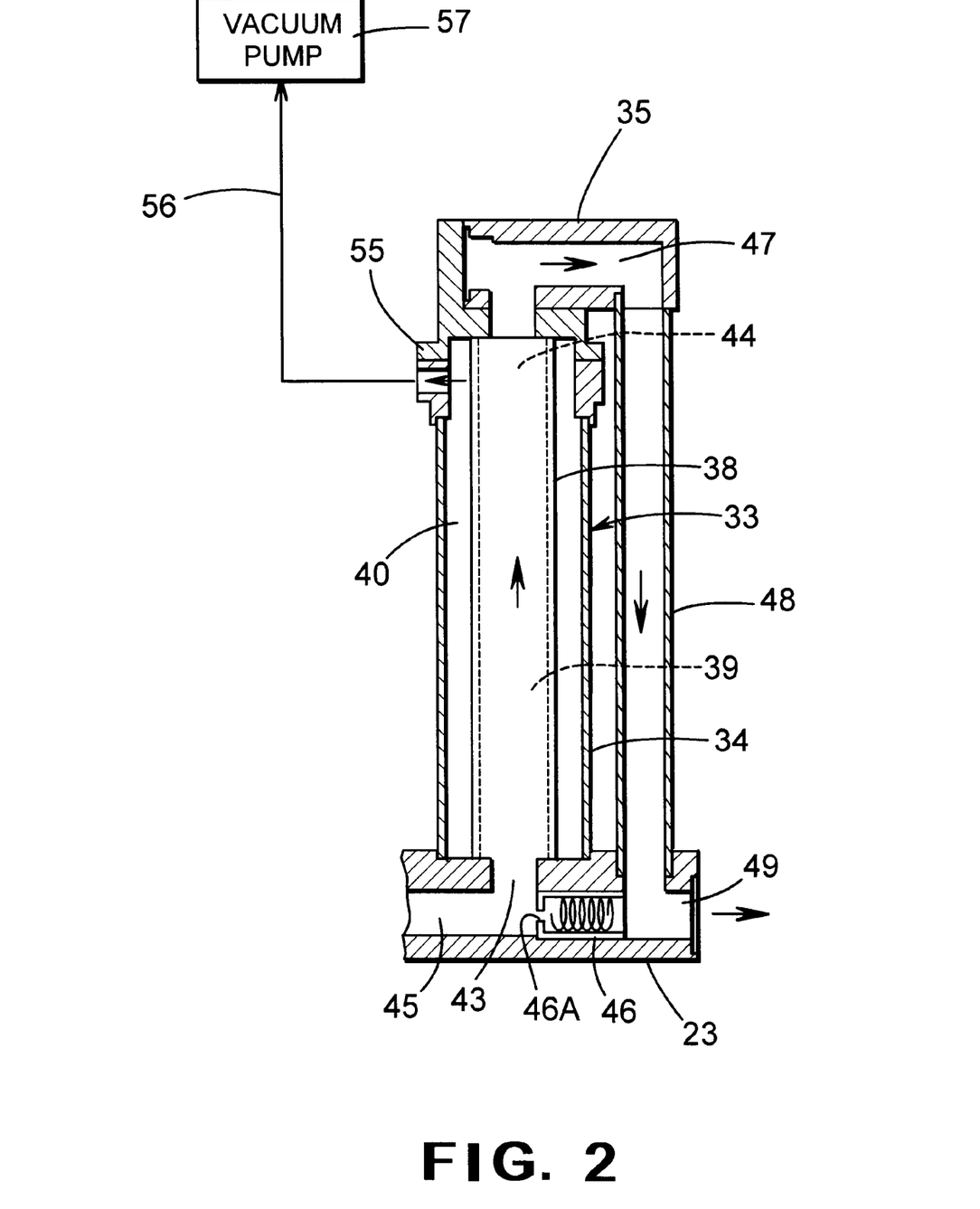
FIG. 2 is a modification of the construction shown in FIG. 1.

Referring now to FIG. 2, a modification of the present invention is shown wherein a vacuum is used to remove water from the permeate or purge-side space, instead of the sweep gas described in connection with FIG. 1. There is no change to the construction of the first fluid containing vessel 21, and this may be identical to the construction shown in FIG. 1. Also, the construction of the second fluid containing vessel 33 shown in FIG. 2 is substantially identical to the second fluid containing vessel shown in FIG. 1, and thus, only the changes in the embodiment shown in FIG. 2 will be described in any detail.

To provide for a supply of vacuum to the permeate or purge-side space 40, the sweep inlet 50, and the sweep outlet 52 are replaced by a vacuum connection 55, which is provided near the top of the second fluid containing vessel 33, and in fluid communication with the permeate-side space 40. A vacuum pump 57 of suitable size for the permeate-side space 40 is connected thereto through vacuum conduit 56. Any suitable vacuum pump well known in the art may be used as long as it is sized properly. Vacuum connection 55 may be provided near the bottom of the second fluid containing vessel, if desired.

Figure 3:
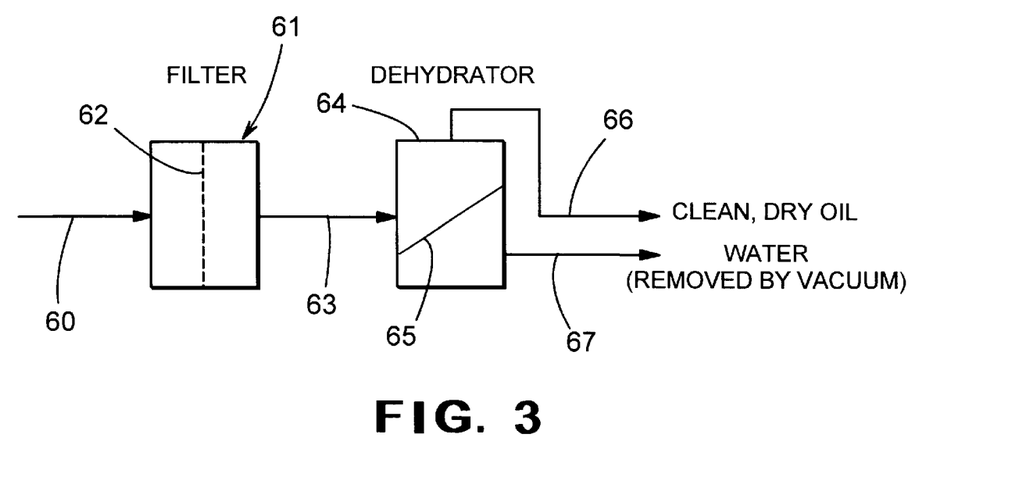
FIG. 3 is a diagrammatic view of the construction shown in FIG. 2.

Various configurations of systems using the filter dehydrator constructions shown in FIGS. 1 and 2 are shown in FIGS. 3–6. Referring to FIG. 3, the invention with a vacuum permeate mode is shown. A water containing feed 60 is introduced to the feed side of a filter vessel 61 so that the oil is efficiently contacted with the filter 62. The feed 60 may optionally be heated before coming into contact with the filter 62. The filtered low volatility liquid becomes the feed 63 for the dehydrator and enters the feed side of a membrane separator vessel 64 so that the oil is efficiently contacted with the membrane 65. The dehydrated oil is removed from the membrane separator vessel 64 in an effluent 66. The permeate 67 is shown being removed by vacuum such as may be created by a vacuum pump. The dehydrator feed 63 may flow parallel or perpendicular to the membrane 65 and the permeate 67 may also flow parallel or perpendicular to the membrane 65 or any combination thereof. Optionally the membrane separator vessel 64 may be heated. Clearly the membrane separator vessel 64 should be sized appropriately to the desired flow rate of the dehydrator feed 63.

Figure 4:
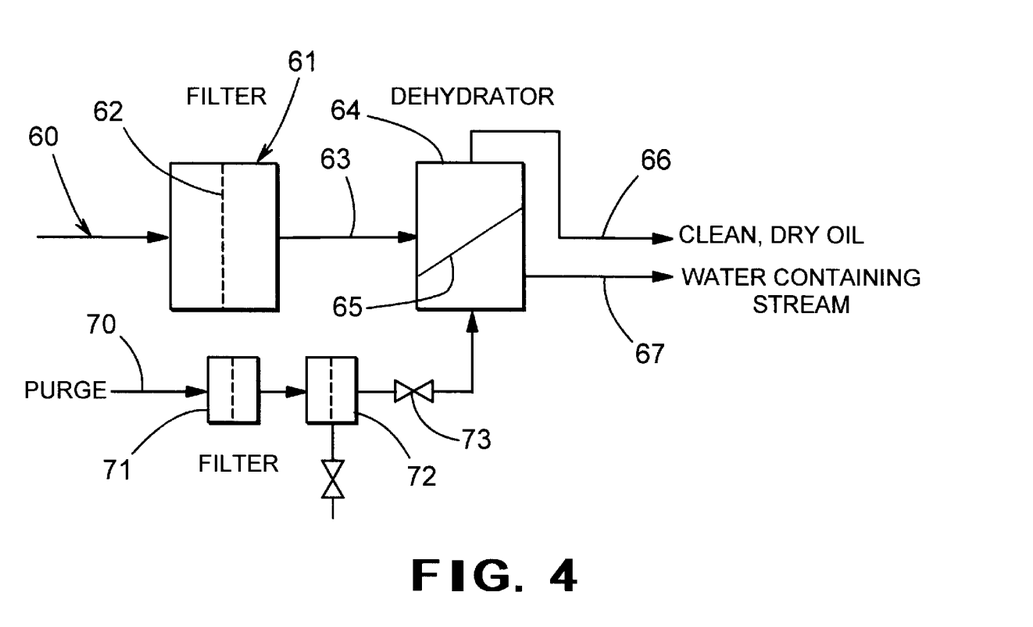
FIG. 4 is a diagrammatic view of the construction shown in FIG. 1 with a filter and a coalescer added upstream of the dehydrator to condition the sweep before it enters the dehydrator.

In FIG. 4 the invention with a sweep gas mode is depicted. Again the water containing feed 60 is introduced to the feed side of a filter vessel 61 so that the oil is efficiently contacted with the filter 62. As before, the filtered oil becomes the dehydrator feed 63 which enters the membrane separator vessel and comes into contact with membrane 65. The clean dry oil is removed as effluent 66, while the permeate 67 exits the membrane separator vessel 64 after passing through the permeate side of the membrane 65. In this embodiment of the invention the permeate 67 is removed by a sweep gas or fluid. In the modification illustrated, the sweep gas or fluid 70 first enters a sweep filter 71 to remove any particulate from the sweep gas or fluid 70, and then passes through a sweep coalescer 72 to remove any entrained or dissolved water or other fluids from the sweep to provide a sweep gas as dry as possible. The pressure of the purge or sweep gas 72 leaving the sweep coalescer 72 is regulated by the purge sweep regulator 73 before the sweep gas or fluid 70 enters the permeate side of the membrane separator vessel 64.

Figure 5:
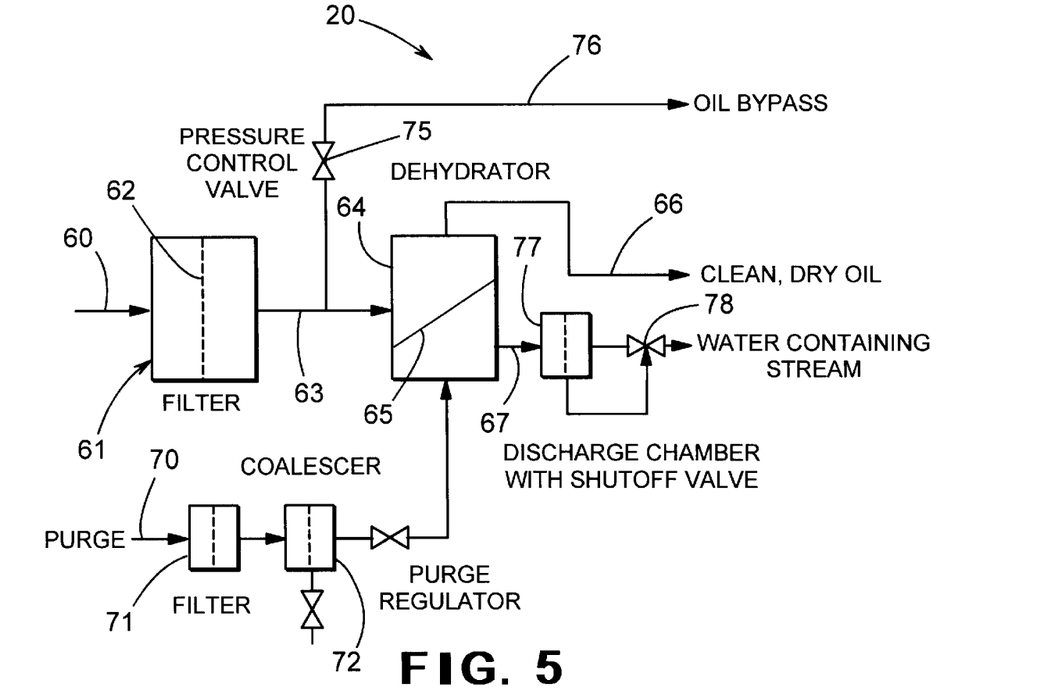
FIG. 5 is a view, similar in part to FIG. 4, and showing the addition of an oil bypass upstream of the dehydrator, and a discharge chamber to condition the sweep before it leaves the dehydrator.

In FIG. 5 an oil by-pass circuit and a discharge chamber are added to the construction shown in FIG. 4. A pressure control valve 75 is interposed between the outlet of the filter vessel 61 and the inlet of the membrane separator vessel 64. When the differential pressure at the pressure control valve 75 exceeds a predetermined desired pressure, part of the oil will pass through the by-pass line without entering the membrane separator vessel 64. This is permissible without effecting the operation of systems in which the filter dehydrator is being used, as the water in the oil takes longer to degrade the performance of the system than does particulate in the oil. Thus, it is most desirable to filter all of the particulate through the filter vessel 61 but it is not necessary to filter all the oil through the membrane dehydrator vessel 64.

To prevent lose of oil in case of failure of the membrane 65, a discharge chamber 77 is provided. The operation of the discharge chamber, to be described hereinafter, is such that upon a sufficient amount of oil coming through the membrane 65, which would indicate a failure of the membrane 65, the discharge chamber 77 stops the flow of sweep gas so as to prevent lose of oil in the system in which the filter dehydrator 20 is being used. A shut off valve 78 is provided in the discharge chamber 77, so that upon detecting oil, the flow of sweep gas may be stopped.

Figure 6:
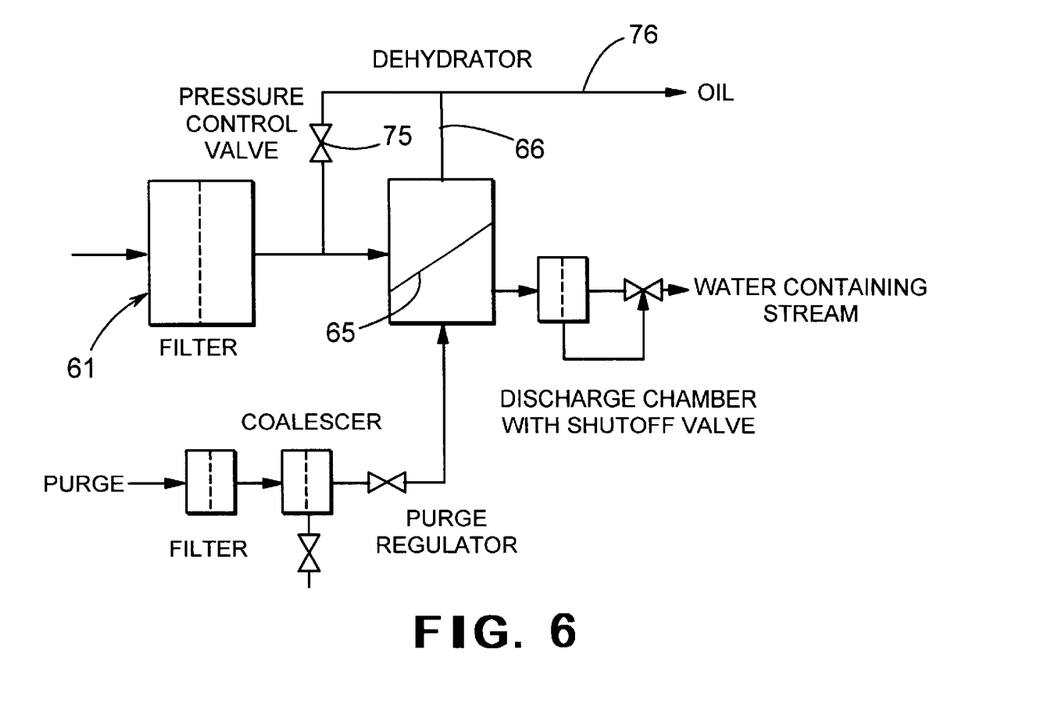
FIG. 6 is a view, similar in part to FIG. 5, but showing the oil bypass in fluid communication with the outlet of the dehydrator.

FIG. 6 shows a construction identical to that shown in FIG. 5 except that the clean dry oil 66, instead of being removed separately, joins the by-pass oil 76 which has come through the pressure control valve 75.

Figure 7:
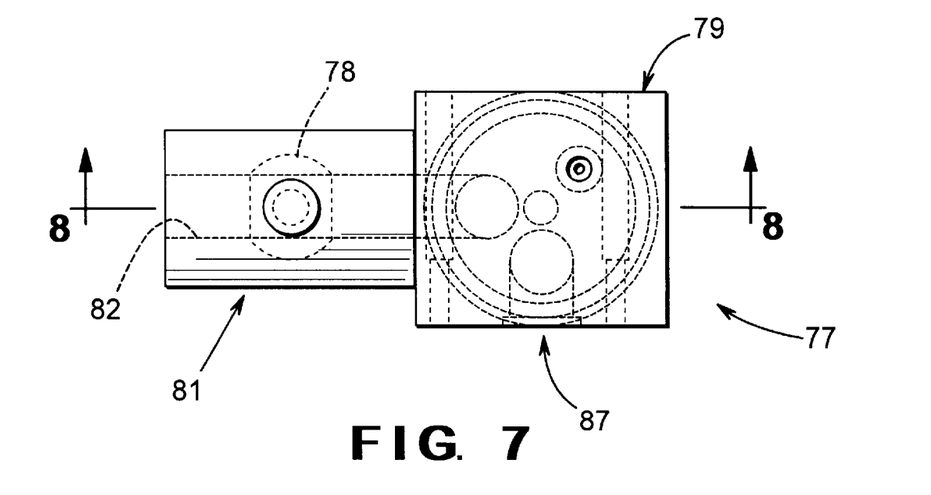
FIG. 7 is a top plan view of a discharge chamber of the present invention.
Figure 8:
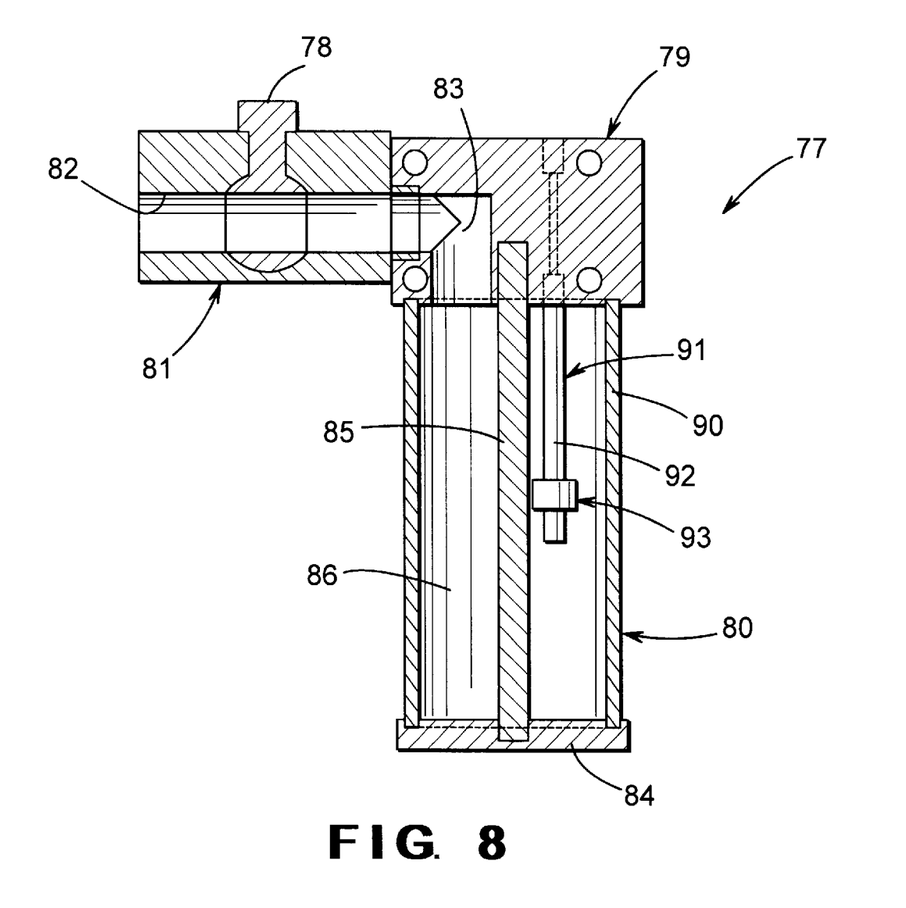
FIG. 8 is a sectional view, taken in the direction of the arrows, along the section line 8—8 of FIG. 7.

Referring to FIGS. 7 & 8, the construction of the discharge chamber is illustrated. The discharge chamber 77 generally has a head portion 79, a bowl portion 80, and a shut-off body portion 81. Shut-off body portion 81 is connected to head portion 79 by means well known in the art, and has a discharge passage 82 in fluid communication with the outlet 83 of the bowl portion 79. Solenoid operated shut-off valve 78 is interposed in discharge passage 82 to shut off the flow therein under conditions described below.

Bowl portion 80 of discharge chamber 77 comprises a center retaining rod 85 connected to head portion 79 and to end cap 84, which, together with bowl, define enclosed space 86. Enclosed space 86 is in fluid communication with permeate 67 through inlet 87.

Mounted to head portion 79, and projecting into space 85, is float switch 91, well known in the art. Float switch 91 comprises float rod 92 upon which float 93 vertically reciprocates, depending on the level of oil in the bowl 80. The specific gravity of the float 93 is chosen so the level of permeate will not affect the float, but the amount of oil in the permeate, and thus, the amount of oil in the bowl 80, will cause the float to rise.

When the amount of oil in the bowl is high enough to cause the float 93 to rise to a predetermined, desired level, the float will cause the float switch to operate in a manner well known in the art, and an electrical signal will be sent to shut-off valve 78 to cause it to operate, and block any further fluid flow through discharge passageway 82. This will prevent any significant oil loss should the filter/dehydrator 20 of the present invention fail for any reason.

The terms and expressions that have been used in the foregoing specification are used as terms of description and not of limitation, and there is no intention in the use of such terms and expressions of excluding equivalents of the features shown and described or portions thereof. It is recognized that the scope of the invention is defined and limited only by the claims that follow.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A device for the purification of oil streams comprising the following:
   (a) a fluid containing vessel including:
      (i) a filter interposed in said vessel dividing said vessel into a feed-side space and a filtrate-side space,
      (ii) at least one inlet opening to the feed-side space, and
      (iii) at least one outlet opening from the filtrate-side space; and
   (b) a second fluid containing vessel connected to the outlet of the filtrate-side space and including:
      (i) a membrane-based dehydrator having a dense, non-porous, defect-free membrane and positioned within said vessel dividing the interior of said second vessel into at least one feed-side space and one permeate-side space,
      (ii) at least one inlet opening to the feed-side space of the dehydrator,
      (iii) at least one outlet opening from the feed-side space of the dehydrator,
      (iv) at least one outlet opening from the permeate-side space of the dehydrator,
      (v) a system outlet in fluid communication with said dehydrator feed-side outlet,
      (vi) a bypass passageway between said dehydrator feed-side inlet and said system outlet, and
      (vii) a pressure control valve positioned within said bypass passageway to enable a portion of the oil stream entering said dehydrator feed-side inlet to bypass the dehydrator in order to maintain a predetermined pressure differential across the dehydrator membrane.

2. A device as defined in claim 1, wherein a pump is provided to force the oil stream through the device.

3. A device as defined in claim 1, comprising a coalescer to capture liquids that may be entrained in sweep gas entering the device.

4. A device as defined in claim 1, wherein the dehydrator permeate-side outlet has a discharge chamber that enables the capture of any oil permeating the dehydrator membrane.

5. A device as defined in claim 4, wherein the discharge chamber is provided with means to sense the presence of a liquid and activate a trigger.

6. A device as defined in claim 4, wherein the discharge chamber is provided with means to sense the presence of a liquid and actuate a valve on a sweep discharge of the dehydrator to prevent any loss of oil from the discharge chamber.

7. A device for the purification of oil streams comprising the following:
   (a) a fluid containing vessel including:
      (i) a filter interposed in said vessel dividing said vessel into a feed-side space and a filtrate-side space,
      (ii) at least one inlet opening to the feed-side space, and (iii) at least one outlet opening from the filtrate-side space; and
(b) a second fluid containing vessel connected to the outlet of the filtrate-side space and including:
   (i) a membrane-based dehydrator having a membrane and positioned within said second vessel dividing the interior of said second vessel into at least one feed-side space and one permeate-side space,
   (ii) at least one inlet opening to the feed-side space of the dehydrator,
   (iii) at least one outlet opening from the feed-side space of the dehydrator,
   (iv) at least one outlet opening from the permeate-side space of the dehydrator,
   (v) a system outlet in fluid communication with said dehydrator feed-side outlet,
   (vi) a bypass passageway between said dehydrator feed-side inlet and said system outlet, and
   (vii) a pressure control valve positioned within said bypass passageway to enable a portion of the oil stream entering said dehydrator inlet opening to bypass the dehydrator in order to maintain a predetermined pressure differential across the dehydrator membrane.

8. A device as defined in claim 7, comprising a coalescer to capture liquids that may be entrained in sweep gas entering the device.

9. A device as defined in claim 8, comprising a discharge chamber that enables the capture of any oil permeating the dehydrator membrane.

10. A device as defined in claim 9, wherein the discharge chamber is provided with means to sense the presence of a liquid and activate a trigger.

11. A device as defined in claim 9, wherein the discharge chamber is provided with means to sense the presence of a liquid and actuate a valve on a sweep discharge of the dehydrator to prevent any loss of oil from the discharge chamber.

* * * * *